United States Patent [19]

Redden et al.

[11] Patent Number: 5,616,434
[45] Date of Patent: Apr. 1, 1997

[54] BATTERY PLATE SEPARATOR ENVELOPE AND METHOD OF FORMING BATTERY PLATE ASSEMBLIES INCLUDING THE SAME

[75] Inventors: Galen Redden, Gypsum, Kans.; Rex E. Luzader, Wyomissing, Pa.

[73] Assignee: Exide Corporation, Reading, Pa.

[21] Appl. No.: 502,866

[22] Filed: Jul. 14, 1995

[51] Int. Cl.$^6$ .................................................. H01M 2/18
[52] U.S. Cl. .......................... 429/136; 427/139; 427/143
[58] Field of Search ................................... 429/136, 139, 429/143, 72, 81, 254

[56] References Cited

U.S. PATENT DOCUMENTS

| | | |
|---|---|---|
| 1,697,212 | 1/1929 | Von Vago et al. . |
| 1,944,794 | 1/1934 | Klinger . |
| 1,954,965 | 4/1934 | Thode . |
| 2,048,895 | 7/1936 | Rosen . |
| 2,192,605 | 3/1940 | Salfisberg . |
| 2,230,849 | 2/1941 | Salfisberg . |
| 2,374,504 | 4/1945 | Salfisberg . |
| 2,382,175 | 8/1945 | Salfisberg . |
| 2,468,517 | 4/1949 | Salfisberg . |
| 2,570,677 | 10/1951 | Honey et al. . |
| 3,271,223 | 9/1966 | Sudo . |
| 3,351,495 | 11/1967 | Larsen et al. . |
| 3,653,913 | 4/1972 | Rambold . |
| 3,703,417 | 11/1972 | Rosa et al. ................ 429/139 |
| 3,727,908 | 4/1973 | Whitesell et al. . |
| 3,843,483 | 10/1974 | Sendor et al. . |
| 3,900,341 | 8/1975 | Shoichiro et al. . |
| 4,026,000 | 5/1977 | Anderson . |
| 4,074,021 | 2/1978 | Aronson ................ 429/139 X |
| 4,080,727 | 3/1978 | Stolle et al. . |
| 4,085,560 | 4/1978 | McClosky . |
| 4,125,424 | 11/1978 | Vecchiotti et al. . |
| 4,161,815 | 7/1979 | Land et al. . |
| 4,216,579 | 8/1980 | Murata et al. . |
| 4,314,403 | 2/1982 | Sanekata . |
| 4,359,511 | 11/1982 | Strzempko ................ 429/139 X |
| 4,407,063 | 10/1983 | Johnson . |
| 5,230,968 | 7/1993 | Bones et al. ................ 429/208 X |

FOREIGN PATENT DOCUMENTS 1497364  1/1978  United Kingdom .

Primary Examiner—Anthony Skapars
Attorney, Agent, or Firm—Nixon & Vanderhye P.C.

[57] ABSTRACT

Battery plate envelopes include a sheet of porous film material having a folded widthwise bottom edge and overlapped lateral edges to thereby form a pocket for receiving a battery plate therein. The overlapped lateral edges are joined to one another by a lengthwise extending series of discontinuous joining regions with adjacent ones of the discontinuous joining regions being separated by respective unsealed regions. These unsealed regions thereby establish respective lateral channels through which fluid (e.g., electrolyte employed in a wet storage battery) may pass to the interior pocket, and hence to the battery plate. The discontinuous joining regions are most preferably formed by passing the sheet material through the nip between opposed joining rings, each of which is provided with a series of triangularly-shaped teeth with smooth land areas formed between adjacent teeth series.

12 Claims, 3 Drawing Sheets

BATTERY PLATE SEPARATOR ENVELOPE AND METHOD OF FORMING BATTERY PLATE ASSEMBLIES INCLUDING THE SAME

FIELD OF INVENTION

The present invention relates generally to the field of wet cell storage batteries, and particularly to the battery plates and separators employed therein.

BACKGROUND OF THE INVENTION

Wet cell storage batteries having alternating positive and negative battery plates with interposed separators to prevent physical contact between the plates are notoriously well known. It is also well known from U.S. Pat. No. 4,026,000 to Anderson (the entire content of which is incorporated expressly hereinto by reference) that the individual battery plates may be enveloped in a folded sheet of porous film material. According to the Anderson patent, the overlapped edges of the sheet are continuously sealed to one another along their entire longitudinal extent. Other patent publications in the battery plate separator art which may be of interest include U.S. Pat. Nos. 4,407,063 to Johnson; U.S. Pat. No. 4,080,727 to Stolle et al and U.S. Pat. No. 4,085,560 to McClosky as well as UK Patent Specification No. 1,497,364 (the entire content of each publication being incorporated expressly hereinto by reference).

SUMMARY OF THE INVENTION

Broadly, the present invention relates to battery plate envelopes having discontinuous edge seals thereby establishing therebetween respective unsealed regions which define fluid flow channels into the interior envelope pocket. More specifically, the battery plate envelopes of this invention include a sheet of porous film material having a folded widthwise bottom edge and overlapped lateral edges to thereby form a pocket for receiving a battery plate therein. The overlapped lateral edges are joined to one another by a lengthwise extending series of discontinuous joining regions with adjacent ones of the discontinuous joining regions being separated by respective unsealed regions. These unsealed regions thereby establish respective lateral channels through which fluid (e.g., electrolyte employed in a wet storage battery) may pass to and from the interior pocket, and hence to the battery plate. The discontinuous joining regions are most preferably formed by passing the sheet material through the nip between opposed joining rings, each of which is provided with a series of triangularly-shaped teeth with smooth, substantially flat land areas formed between adjacent teeth series.

These and other aspects of the invention will become more clear after careful consideration is given to the detailed description of the preferred exemplary embodiments below.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
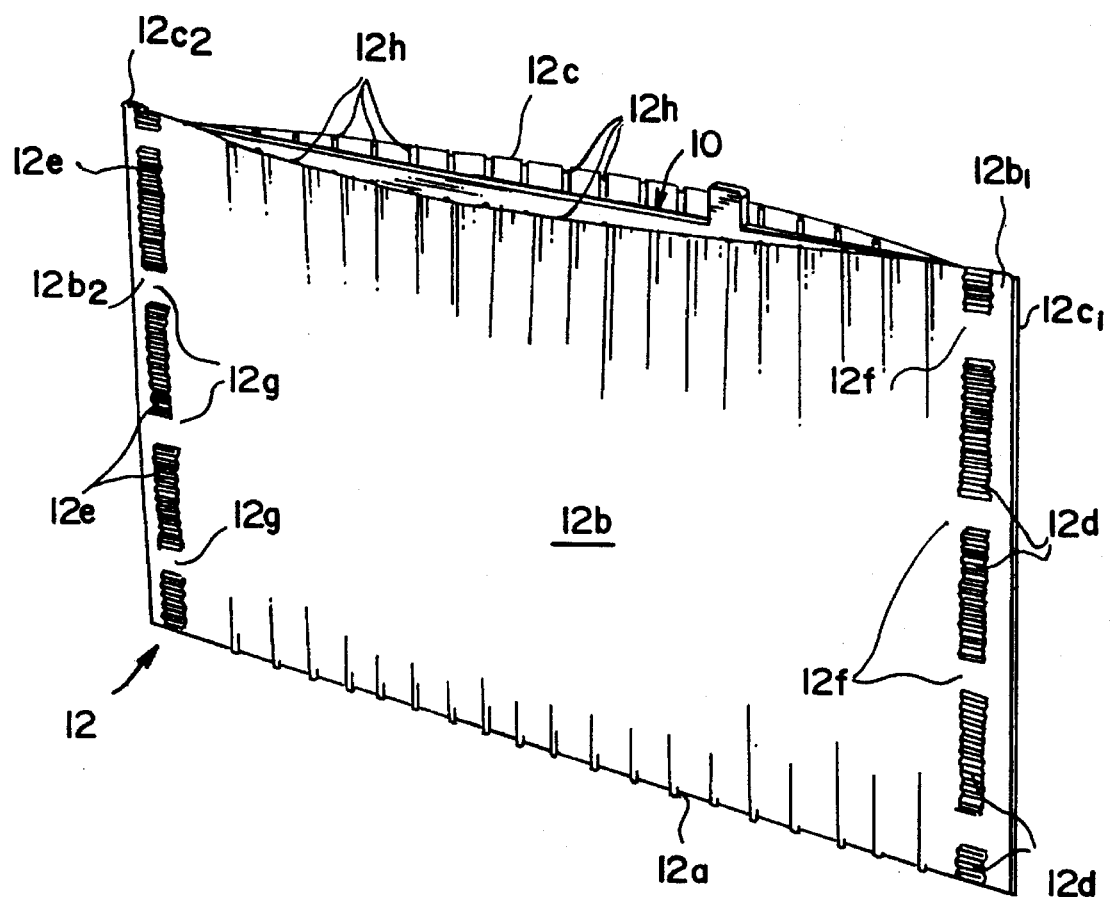
FIG. 1 is a schematic perspective view of a battery plate positioned in a discontinuous edge-sealed microporous film envelope according to the present invention.

Accompanying FIG. 1 shows an exemplary enveloped battery plate BP which includes a battery plate 10 positioned within the interior pocket of a plate envelope 12. As is shown, the plate envelope 12 has a bottom edge 12a formed along a fold line between opposite side panels 12b, 12c. The widthwise dimension of the side panels 12a, 12b is greater than the widthwise dimension of the battery plate 10 so that the lateral edges $12b_1$, $12c_1$ and $12b_2$, $12c_2$ of the side panels 12b, 12c overlap one another in a region outside the lateral extent of the battery plate 10.

These overlapped side edges $12b_1$, $12c_1$ and $12b_2$, $12c_2$ of the side panels 12b, 12c are joined to one another by a longitudinally extending series of corrugated joining regions 12d, 12e, respectively. Adjacent ones of the corrugated joining regions 12d, 12e thus establish therebetween discrete regions 12f, 12g where the side edges $12b_1$, $12c_1$ and $12b_2$, $12c_2$ are not sealed to one another. The unsealed regions 12f, 12g established between the lengthwise extending corrugated joining regions 12d, 12e, respectively, thereby define lateral or widthwise extending channels through which fluid (e.g., electrolyte) may flow into and out of the interior pocket of the plate envelope 12 and thus into contact with the battery plate disposed therewithin. As such, circulation of the electrolyte within the storage battery cell is improved while maintaining the necessary physical separation between adjacent battery plates.

Any suitable porous material which is inert to the components employed in wet cell storage batteries may be employed in the practice of this invention. Most preferably, the material forming the plate envelope 12 is a microporous film material formed of a polyolefin-based plastics as described more fully in U.S. Pat. No. 3,351,495 (the entire content of which is incorporated expressly hereinto by reference). A commercially available separator material is available under the tradename SUBMICRO®. The film material most preferably is formed with longitudinally extending rib elements 12h as shown in FIG. 1 so as to maintain slight separation between the battery plate 10 and the side panels 12b, 12c of the plate envelope 12.

Figure 2:
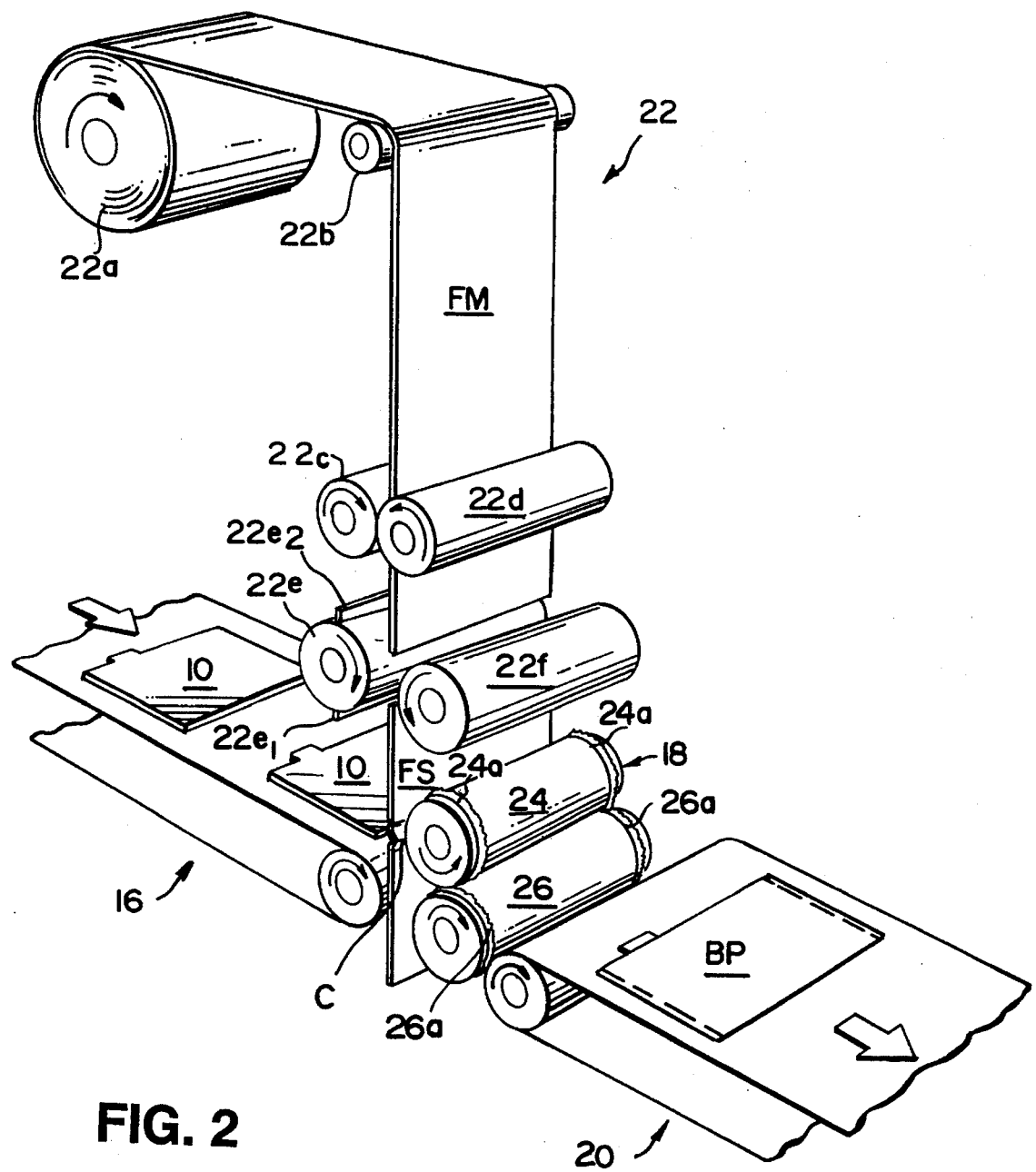
FIG. 2 is a schematic representation of the enveloping apparatus employed to obtain the discontinuous edge-sealed battery plate envelope shown in FIG. 1.

A presently preferred automated apparatus 14 for enveloping the battery plate 10 with the plate envelope 12 is shown in accompanying FIG. 2. The apparatus is generally comprised of (i) a battery plate infeed conveyor system 16 which sequentially presents battery plates 10 to the envelope-forming section 18, (ii) an enveloped battery plate discharge conveyor system 20 which transports the enveloped battery plates BP to a downstream location where they may be further processed and eventually assembled in a battery case (not shown), and (iii) a film feeding system 22 which feeds the microporous film material FM ultimately forming the envelope 12 to the envelope-forming section 18.

The film material FM is fed from a rotatable supply roll 22a around a guide roller 22b and then between a pair of driven feed rollers $22c$, $22d$. The rollers $22c$, $22d$ may be driven at a desired speed ratio relative to the downstream sizing cylinder $22e$ so as to present a sufficient length of the film material FM to the envelope-forming station 18. In this regard, the film material FM is cut into sheets of sufficient length by the sizing cylinder $22e$ which rotates in opposition to the platen cylinder $22f$. A cutting blade $22e_1$ cuts the film material to form a film sheet FS which had previously been acted upon by creasing blade $22e_2$ forming a widthwise extending crease C in the film sheet FS which will ultimately form the bottom edge $12a$ of the plate envelope 12.

The battery plates 10 are fed by conveyor system 16 bottom-edge-first into the envelope-forming station 18. In this regard, the bottom edge of the battery plate will be fed into registry with the crease C formed in the film sheet FS and is propelled into the nip formed between the driven joining cylinders 24, 26. The film sheet FS is thus folded rearwardly over the battery plate 10 causing its conveyance through the nip formed between the joining cylinders 24, 26 thereby enveloping the same. At the same time, the lateral intermeshed pairs of widthwise-separated, serrated edge-joining rings $24a$, $26a$ carried at the lateral sides of joining cylinders 24, 26 will respectively form the series of corrugations of the discontinuous joining regions $12d$, $12e$ and the unsealed regions $12f$, $12g$ therebetween at the side edges $12b_1$, $12c_1$ of the envelope 12.

Figure 3:
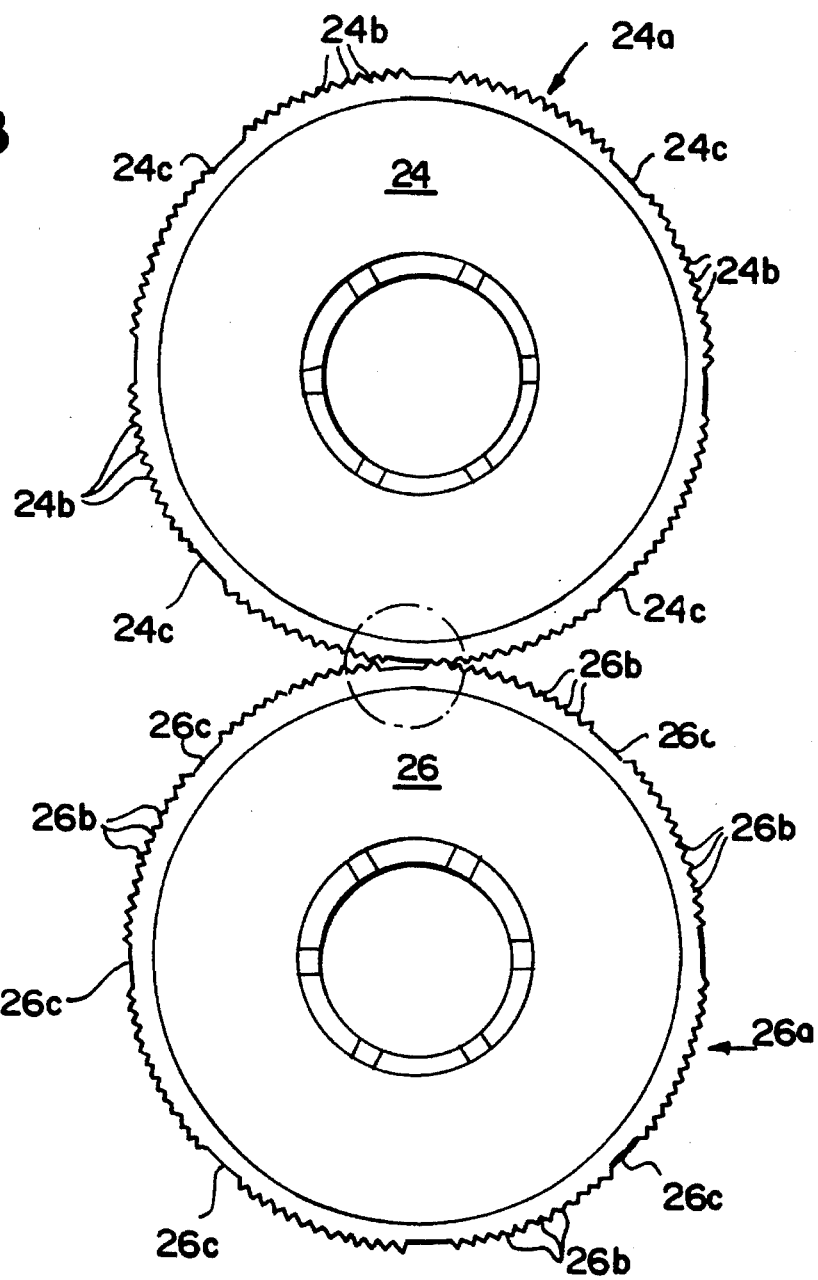
FIG. 3 is a side elevational view showing a presently preferred pair of discontinuous edge-joining rollers to obtain the battery plate envelope shown in FIG. 1.
Figure 4:
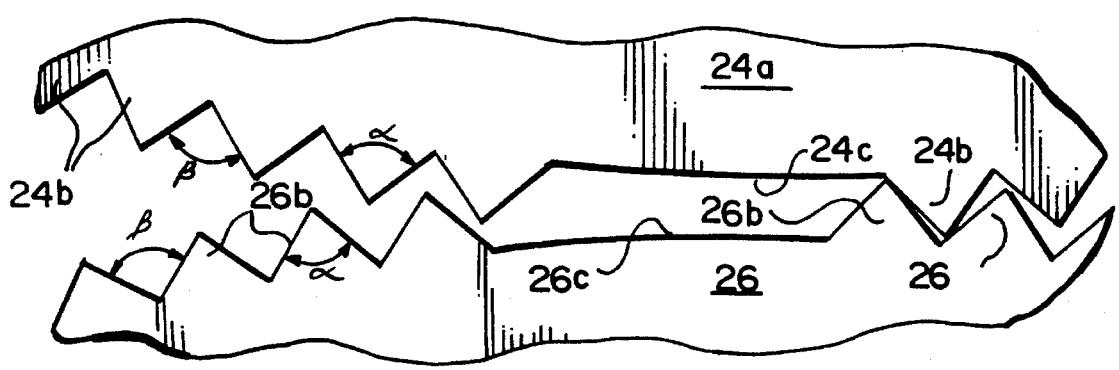
FIG. 4 is a detailed elevation view of a region of the edge-joining rollers which is bounded by the chain line in FIG. 3.

An exemplary pair of the intermeshed joining rings $24a$, $26a$ is shown more clearly in accompanying FIGS. 3 and 4. In this regard, it will be observed that each of the peripheries of the joining rings $24a$, $26a$ includes a series of sharp, triangularly-shaped teeth (a representative few of which are identified in FIGS. 3 and 4 by reference numerals $24b$, $26b$), with adjacent series of teeth being separated by non-serrated (smooth), substantially flat land regions (a representative few of which are identified in FIGS. 3 and 4 by reference numerals $24c$, $26c$), respectively. Moreover, these land regions $24d$, $26d$ are substantially in opposed registry with one another during rotation of the joining tings $24a$, $26b$. Most preferably, the individual teeth $24a$, $26a$ form an isosceles triangle having an included apex angle $\alpha$ which is less than the angle $\beta$ formed by the space between adjacent ones of the teeth $24b$, $26b$. In a presently preferred embodiment, the included angle $\alpha$ formed by any one tooth is about 79°, and the angle $\beta$ between adjacent teeth is about 82°. The land regions $24d$, $26d$, on the other hand, occupy a sufficient peripheral arc of the rings $24a$, $26a$ so as to establish the unsealed regions $12f$, $12g$ of meaningful length. At present, the land regions $24d$, $26d$ established by removing between two to six, preferably three, of the teeth $24b$, $26b$ from what was initially a continuously toothed ting.

The structure of the joining rings $24a$, $26a$ and the tooth configuration described above establishes a non-uniform clearance between the teeth $24b$, $26b$ which thereby translates into a non-uniform compressive force being applied to the overlapped edges $12b_1$, $12c_1$ and $12b_2$, $12c_2$. The rings are adjustable in the sense that they may be moved toward or away from each other in any conventional manner. In a preferred arrangement, the rings $24a$, $26a$ are initially set in contact with one another, and due to the inherent, albeit slight, flexibility of the shafts on which the rings $24a$, $26a$ are mounted, the thickness of the film material FM itself causes the joining rings to separate by an amount substantially equal to the film material thickness. In this manner, the overlapped edges $12b_1$, $12c_1$ and $12b_2$, $12c_2$ may be mechanically joined to one another via the formation of the discontinuous joining regions $12d$, $12e$ without excessive stretching or distortion of the film material forming the overlapped edges $12b_1$, $12c_1$ and $12b_2$, $12c_2$. Thus, it is not necessary to form an integral seal in the nature of a "weld". At the same time, the unsealed regions $12d$, $12g$ are formed which facilitate the flow of electrolyte therethrough, into and out of the interior pocket of the plate envelope $12b$ thereby improving electrolyte circulation within the battery cell in which the enveloped battery plate BP is employed.

While the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A battery plate envelope comprising:
   a sheet of porous film material having a folded bottom edge and overlapped lateral edges which form a pocket for receiving a battery plate;
   said overlapped lateral edges being joined to one another by an extended series of discontinuous nonwelded but mechanically joined regions with adjacent ones of the joined regions being separated by respective unsealed regions which establish a lateral channel through which fluid may pass.

2. The battery plate envelope as in claim 1, wherein said porous film material includes a plurality of lengthwise extending rib elements.

3. The battery plate envelope as in claim 2, wherein said rib elements are disposed within the pocket.

4. The battery plate envelope as in claim 1, wherein said porous film material is a microporous polyolefin film.

5. The battery plate envelope as in claim 1, wherein said joined regions are corrugated.

6. The combination comprising the battery plate envelope of claim 1, and a battery plate for a wet storage battery positioned within said pocket.

7. A battery plate envelope comprising:
   a sheet of porous film material having a folded bottom edge and overlapped lateral edges which form a pocket for receiving a battery plate; and
   an extended series of discontinuous joined regions formed of corrugations which mechanically join said overlapped lateral edges to one another, wherein
   adjacent ones of said joined regions establish unsealed regions therebetween.

8. A battery plate envelope as in claim 7, wherein said porous film material includes a plurality of parallel rib elements.

9. A battery plate envelope as in claim 8, wherein said rib elements are disposed within the pocket.

10. A battery plate envelope as in claim 7, wherein said porous film material is a microporous polyolefin film.

11. A combination comprising a battery plate envelope of any one of claims 8–10, and a battery plate for a wet storage battery positioned within said pocket.

12. A plurality of combinations as in claim 11, arranged within a wet storage battery and including battery electrolyte flowing in and out of the unsealed regions of each said battery plate envelope.

* * * * *